Jan. 4, 1944.  C. C. CASH ET AL  2,338,405
PROTECTIVE SYSTEM
Filed July 3, 1941
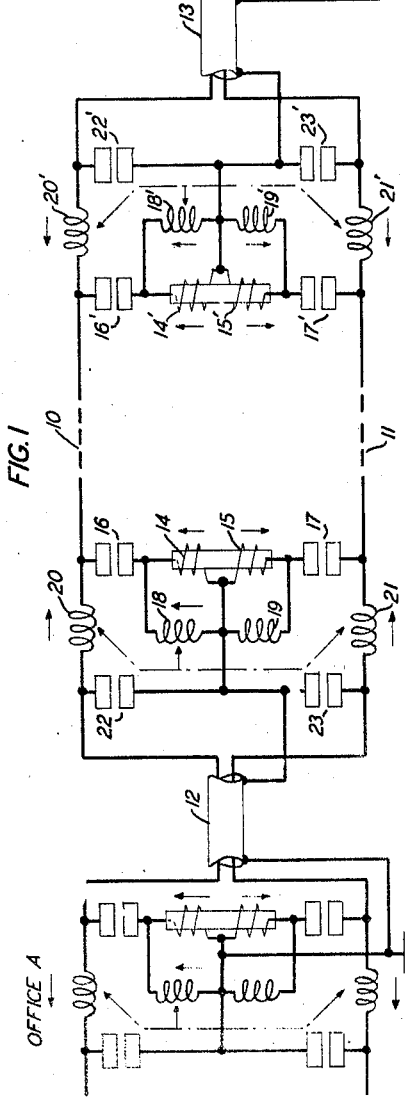
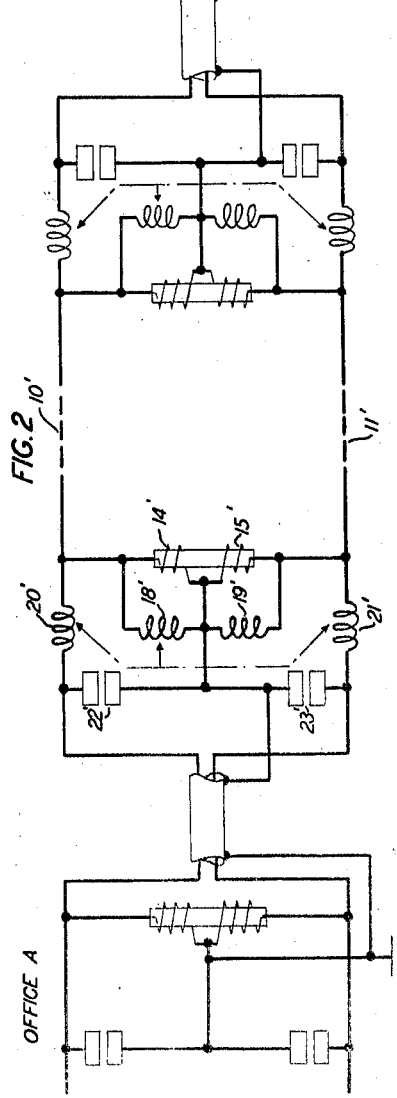
INVENTORS C. C. CASH
K. H. PERKINS
BY
H. G. Bandfield
ATTORNEY Patented Jan. 4, 1944

2,338,405

UNITED STATES PATENT OFFICE 2,338,405

PROTECTIVE SYSTEM

Claude C. Cash, New York, and Kenneth H. Perkins, Valley Stream, N. Y., assignors to Bell Telephone Laboratories, Incorporated, New York, N. Y., a corporation of New York Application July 3, 1941, Serial No. 400,890

12 Claims. (Cl. 178—69)

This invention relates in general to protective systems and more particularly to a protective system for minimizing inductive interference such as that caused by lightning in carrier telegraph circuits.

Heretofore it has been a customary practice to reduce lightning interference on high frequency circuits such as carrier telegraph circuits by employing a drainage coil connected across the line wires through relatively low breakdown voltage protector gaps backed up by protector gaps having a higher breakdown voltage which are connected between the respective line wires and ground. Such an arrangement and improved types of drainage coils are disclosed in Patent No. 2,249,808, granted to C. C. Cash on July 22, 1941. As the result of extensive field tests it has been observed that arrangements of this type are effective in reducing the number of "hits" and therefore the false telegraph signals in the great majority of cases and that the remaining interference due to lightning is caused in a large part by the operation of the back-up protectors particularly those mounted at the cable terminals where the open wire conductors are joined to the conductors of the entrance cables. It has been further observed that this protector operation is caused by the lightning discharge current flowing to ground in the drainage coil producing voltages sufficient to break down these back-up protectors.

It is therefore an object of this invention to further reduce lightning interference in such a circuit by reducing the operation of the back-up protectors resulting from operation of the drainage coils when discharging the more severe lightning impulses.

In accordance with a feature of the invention this result is accomplished by inducing into the line wires longitudinal voltages which will largely neutralize voltages to ground such as those caused by current flowing through the drainage coil.

In accordance with another feature, a pair of balanced reactance coils are connected one across one-half the drainage coil and the other across the other half of the drainage coil, and one of these reactance coils serves as a primary winding of a transformer which is provided with a pair of secondary windings connected respectively in series with the line wires. These and other features of the invention may be more clearly understood by reference to the accompanying drawing, in which:

Fig. 1 discloses a protective system embodying the features of the invention in which a drainage coil is connected to the line wires through gap protectors; and Fig. 2 discloses a similar protective system in which the drainage coil is connected directly across the line wires.

Referring to Fig. 1 of the drawing there is disclosed a protective system applied to a communication system in which the conductors 10 and 11 extending between offices A and B are carried on open wire construction and are thus exposed to lightning interference. These conductors extend into office A through entrance cable 12 and into office B through a similar entrance cable 13. A drainage system in accordance with applicants' invention is installed at either end of the open wire construction, the apparatus being usually mounted on the terminal poles where the open wires are joined to the cable conductors. This protective system as shown connected to the line side of entrance cable 12 comprises a drainage coil consisting of two balanced windings 14 and 15 connected to the line wires 10 and 11 through gap protectors 16 and 17, respectively. The windings 14 and 15 are connected inductively in series aiding so as to offer a high impedance to metallic currents tending to flow between the line wires 10 and 11 and a low impedance to longitudinal current flowing from either conductor to ground. The common point of these windings is connected to the sheath of cable 12 which in turn is grounded. Connected in parallel with windings 14 and 15, respectively, are reactance coils 18 and 19 which are carefully balanced and by virtue of ground being connected to the mid-point of the drainage coil, the terminals of the balanced reactance coils connected thereto are also grounded. Coil 18, as shown by the dot-dash lines and arrows, is magnetically coupled to a pair of secondary windings 20 and 21 which are connected respectively in series with the line conductors between the protectors 16 and 17 and the back-up protectors 22 and 23. The impedance of the windings 18 and 19 is high with respect to the impedance of windings 14 and 15 so that practically all of the current drained from the line conductors passes through the drainage coil windings. The secondary windings 20 and 21 are also balanced and are so poled that voltages induced therein by current flowing through the primary winding 18 of the transformer are in the same longitudinal direction, and tend to neutralize the voltages between the line conductors and ground caused by the lightning discharge currents flowing to ground through windings 14 and 15. In certain cases it may be found desirable to connect the free ends of reactance coils 18 and 19 to the line side of protectors 16 and 17.

Similar protective apparatus is installed at the opposite end of the open wire line where the line wires are connected to the entrance cable 13 extending into office B. This apparatus comprises a drainage coil provided with windings 14' and 15', reactance coils 18' and 19', the former of which serves as a primary winding for the secondary windings 20' and 21' installed between the line protectors 16' and 17' and the back-up protectors 22' and 23'. Also similar protective equipment is shown at the office end of entrance cable 12. However, field experience has shown that the back-up protectors in the office protective system, operate so infrequently that it is usually not necessary to resort to neutralizing voltages here but is sufficient to employ only a drainage coil connected across the line conductors through relatively low breakdown protectors with the customary higher voltage breakdown back-up protectors connected between line wires and ground as shown at office B. Under certain conditions, it may be satisfactory, when using the protection arrangement at the cable poles, as shown in Fig. 1, to dispense with the drainage coils at the office ends of the entrance cables and employ only back-up protectors as shown for office B of Fig. 2.

In the arrangement as disclosed in Fig. 2 the protective equipment employed at the terminal ends of the open wire construction is the same as disclosed in Fig. 1 except for the fact that the terminals of the drainage coil are connected directly to the line wires instead of through gap protectors. Thus the windings 14' and 15' of the drainage coil are connected directly to the line wires 10' and 11' and balanced reactance coils 18' and 19' are connected in parallel with the drainage coil windings, the former of which serves as a primary winding for the secondary windings 20' and 21' connected in series with the line conductors between the back-up protectors 21' and 22' and the terminals of the drainage coil. As shown at office A the reactance coils and associated secondary windings are dispensed with and the protective apparatus consists only of the drainage coil and back-up protectors. The protective apparatus disclosed at office B consists merely of protectors connected between either line conductor and ground. In most cases it is preferable to have the same protective apparatus at both terminal offices in the more severe cases using the circuit arrangement of office A and in less severe exposure that of office B.

In the operation of the system as disclosed in Fig. 1 it may be assumed that the potentials induced between line conductors 10 and 11 and ground are substantially equal. However, the protectors 16 and 17 will seldom have the same identical breakdown value so that one of these protectors will ordinarily break down first and apply the voltage from the associated line conductor to ground across the corresponding winding of the drainage coil. The small current flow through this winding, which remains a high impedance to ground until the other winding is connected to its associated line wire, induces a voltage in the other winding which adds to the voltage already across the protector block having the higher breakdown and thereby assures its operation. As soon as both protector blocks have operated, the impedance from lines 10 and 11 to ground is a low value and is balanced so that the current which flows to ground or is drained through windings 14 and 15 raises the potential to ground of both lines by the same amount. In the absence of the neutralizing windings 20 and 21 the voltage due mainly to the I. Z. drop across the windings 14 and 15 of the drainage coil is in some cases sufficient to cause the breakdown of one of the back-up protectors 22 or 23. This I. Z. drop is the potential from either line conductor to ground resulting from the current flowing through windings 14 and 15 in parallel to ground. It is a product of the current flowing in these windings and their impedance which is composed of their D. C. resistance and leakage inductance. Upon the breakdown of one of these protectors there is produced a potential difference between the line conductors 10 and 11 sufficient to cause metallic currents to flow and thereby make possible false operation of the telegraph apparatus. However, in accordance with this arrangement the voltages induced into the line conductors by windings 20 and 21 neutralize these voltages to such an extent as to prevent the breakdown of the back-up protectors. The drainage coil windings are connected in series aiding so as to offer a high impedance to the metallic circuit currents thereby minimizing the effect on normal telephone transmission. While it would be possible to use the reactance coils 18 and 19 as primary windings for the secondary coils 20 and 21, respectively, from a transmission standpoint, such an arrangement has been found to be less satisfactory than the arrangement disclosed in which one of these coils serves as the primary winding for both of the secondary windings 20 and 21.

These protective systems have been described in connection with minimizing inductive interference caused by lightning which is by far the greatest source of trouble but the systems are equally applicable for minimizing inductive interference due to either causes, such for example as sand or snow storms.

What is claimed is:

1. A protective system for communication lines including a pair of line conductors exposed to inductive interference, said system comprising means for draining to ground currents produced in said conductors by inductive interference, said means including an element connected between said conductors and having when operated a low impedance to drainage currents, and means coupled to said element and responsive to flow of drainage currents therethrough for inducing in said conductors potentials neutralizing the potential variations of said conductors due to the flow of current through said draining means.

2. A protective system for communication lines including a pair of line conductors exposed to inductive interference, said system comprising means for draining to ground currents produced in said conductors by inductive interference, said means including a coil bridged across said conductors and connected to ground, and means including a neutralizing transformer the primary winding of which is constituted by at least a part of said coil for inducing in said conductors potentials in opposition to the potentials produced on said conductors as the result of current flowing from said conductors to ground through said coil.

3. A protective system for communication lines including a pair of line conductors exposed to inductive interference said system comprising a drainage coil including a pair of balanced windings connected inductively in series aiding and having their common point grounded connected between said line conductors, and inductive means associated with said drainage coil for inducing potentials in said line conductors in opposition to the potentials set up in said conductors as the result of current flowing through said drainage coil.

4. A protective system for communication lines exposed to inductive interference, comprising a drainage coil including a pair of balanced windings connected inductively in series aiding with the mid-point grounded, the free ends of said windings being connected to the respective conductors of said communication line through gap protectors having relatively low breakdown values, a pair of gap protectors of relatively high breakdown values connected between the respective line conductors and ground, a pair of balanced reactance coils connected in parallel with said drainage coil windings, and having their common point grounded and a pair of secondary windings magnetically coupled to one of said reactance coils and connected serially in said line conductors between said pairs of gap protectors.

5. A protective system for communication lines exposed to inductive interference, comprising a drainage coil consisting of a pair of balanced windings connected inductively in series aiding with the mid-point grounded, said drainage coil windings being connected to the respective line conductors through protectors having relatively low breakdown values, a pair of balanced reactance coils connected in parallel with the respective windings of said drainage coil and having their common point grounded and a pair of secondary windings magnetically coupled to one of said reactance coils and connected in series with the respective line wires, said secondary windings being so poled as to induce potentials in said line wires in opposition to the potentials set up by the flow of current through said drainage coil.

6. A protective system for communication lines exposed to inductive interference, comprising a drainage coil consisting of a pair of balanced windings connected inductively in series aiding, the free ends of said windings being connected to the respective conductors of said communication line and the common point of said windings being grounded, a neutralizing transformer consisting of a primary winding connected in parallel with one of said drainage coil windings and a pair of secondary windings connected in series with said respective line conductors and a reactance coil connected in parallel with the other of said drainage windings.

7. A protective system for communication lines exposed to inductive interference, comprising a drainage coil connected between the conductors of the communication line and comprising a pair of relatively low impedance windings connected together inductively in series aiding with their common point grounded, a pair of reactance coils of relatively high impedance connected in parallel respectively with said drainage coil windings and a pair of secondary windings magnetically coupled to one of said reactance coils and connected in series with the respective line conductors, said secondary windings being so poled as to induce potentials in said conductors in opposition to the potentials set up by the I. Z. drop in said drainage coil windings caused by the flow of drainage currents therethrough.

8. A protective system for communication lines exposed to inductive interference, comprising means for draining to ground potentials above a predetermined value induced in the conductors of said communication line, additional means operative at a higher predetermined potential for grounding said line conductors, and means controlled by the operation of said drainage means for preventing the operation of said additional grounding means as the result of the operation of said drainage means.

9. A protective system for communication lines including a two-conductor section of open-wire construction exposed to lightning, protector means adjacent each terminal of said section and connected to said conductors and ground, means adjacent each terminal bridged across said conductors and connected to ground for draining to ground currents induced in said conductors by lightning, and means energized by said draining means for neutralizing potentials between said conductors and ground produced by currents discharged through said draining means.

10. A method of protecting communication lines including a pair of line conductors from inductive interference which comprises draining the induced potentials from either conductor of said line to ground and inducing potentials in either conductor to neutralize the potentials set up therein as the result of said drainage operation.

11. A method of protecting communication lines including a pair of line conductors from inductive interference which comprises draining the induced potentials from either conductor of said line to ground upon said potentials reaching a predetermined value, and inducing potentials in each of said conductors to neutralize the potentials produced therein as the result of said drainage operation.

12. A method of protecting communication lines including a pair of line conductors from inductive intereference which comprises draining the induced currents from either conductor of said line to ground and inducing potentials in said conductors of a value dependent upon the flow of drainage current, to neutralize the potentials set up in said conductors as the result of said drainage operation.

CLAUDE C. CASH.
KENNETH H. PERKINS.